US012609555B2

(12) United States Patent     (10) Patent No.:   US 12,609,555 B2

Hosotani et al.     (45) Date of Patent:    Apr. 21, 2026

(54) SHORT-RANGE WIRELESS COMMUNICATION DEVICE

(71) Applicant: Murata Manufacturing Co., Ltd., Kyoto-fu (JP)

(72) Inventors: Tatsuya Hosotani, Nagaokakyo (JP); Takahiro Nagai, Nagaokakyo (JP); Hiromitsu Ito, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 84 days.

(21) Appl. No.: 18/415,482

(22) Filed: Jan. 17, 2024

(65) Prior Publication Data

US 2024/0154463 A1    May 9, 2024

Related U.S. Application Data

(63) Continuation of application No. PCT/JP2022/027791, filed on Jul. 15, 2022.

(30) Foreign Application Priority Data

Jul. 27, 2021    (JP) ................................. 2021-122387

(51) Int. Cl.
*H02J 50/12*      (2016.01)
*H04B 5/79*      (2024.01)

(52) U.S. Cl.
CPC ................ *H02J 50/12* (2016.02); *H04B 5/79* (2024.01)

(58) Field of Classification Search
CPC .............. H02J 50/12; H02J 50/80; H04B 5/00
See application file for complete search history.

(56) References Cited

U.S. PATENT DOCUMENTS 8,676,277 B2 *   3/2014   Takayama ......... H04W 52/0274
                                                       455/574
10,176,415 B2   1/2019   Wendling (Continued)

FOREIGN PATENT DOCUMENTS

JP     2011-215865 A    10/2011
JP       5013019 B1     8/2012

(Continued)

OTHER PUBLICATIONS

International Search Report issued in PCT/JP2022/027791; mailed Oct. 11, 2022.

*Primary Examiner* — Daniel Cavallari
*Assistant Examiner* — Joseph N Inge
(74) *Attorney, Agent, or Firm* — Studebaker Brackett PLLC

(57)            ABSTRACT

A short-range wireless communication device includes a coil, a capacitor, a short-range wireless communication IC, and a rectifier circuit. The short-range wireless communication IC and the rectifier circuit are connected to the coil via a node. The capacitor is connected between the node and the rectifier circuit. A receiving circuit is composed of the coil and a power-receiving circuit is composed of the coil and the capacitor. An output impedance of the receiving circuit is set larger than an output impedance of the power-receiving circuit at a communication frequency, and the output impedance of the power-receiving circuit is set smaller than the output impedance of the receiving circuit at a power-receiving frequency, by appropriately setting capacitance of the capacitor.

20 Claims, 10 Drawing Sheets

(56)                    References Cited

U.S. PATENT DOCUMENTS

2012/0235508 A1 *    9/2012  Ichikawa  ................. H04B 5/79
                                                              307/104
2015/0054345 A1 *    2/2015  Monat  ..................... H02J 50/12
                                                              307/104

FOREIGN PATENT DOCUMENTS

JP             5077476 B1     11/2012
JP             5168404 B1      3/2013
JP             6244538 B2     12/2017
WO      WO-2017145879 A1 *   8/2017   ............ H01F 38/14
WO         2021/131128 A1     7/2021
WO         2021/140692 A1     7/2021
WO      WO-2021245980 A1 *  12/2021   .............. H02J 50/12

* cited by examiner

SHORT-RANGE WIRELESS COMMUNICATION DEVICE

CROSS-REFERENCE TO RELATED APPLICATIONS

This application claims benefit of priority to International Patent Application No. PCT/JP2022/027791, filed Jul. 15, 2022, and to Japanese Patent Application No. 2021-122387, filed Jul. 27, 2021, the entire contents of each are incorporated herein by reference.

BACKGROUND

Technical Field

The present disclosure relates to short-range wireless communication and a short-range wireless communication device that performs power reception.

Background Art

Japanese Patent No. 5013019, Japanese Patent No. 5077476, Japanese Patent No. 5168404 and Japanese Patent No. 6244538 describe non-contact charging modules. The non-contact charging modules of Japanese Patent No. 5013019, Japanese Patent No. 5077476, Japanese Patent No. 5168404 and Japanese Patent No. 6244538 have a wireless communication function. The non-contact charging modules of Japanese Patent No. 5013019, Japanese Patent No. 5077476, Japanese Patent No. 5168404 and Japanese Patent No. 6244538 separately include a coil for charging (for power reception) and an antenna for wireless communication.

U.S. Pat. No. 10,176,415 describes a passive RFID device. The passive RFID device of U.S. Pat. No. 10,176,415 has a power-receiving function. The passive RFID device of U.S. Pat. No. 10,176,415 receives power with the antenna for performing wireless communication. The passive RFID device of U.S. Pat. No. 10,176,415 includes a switch. A passive RFID described in U.S. Pat. No. 10,176,415 switches between wireless communication and power reception by flipping the switch.

SUMMARY

However, in the configurations of Japanese Patent No. 5013019, Japanese Patent No. 5077476, Japanese Patent No. 5168404 and Japanese Patent No. 6244538, the separate provision of the coil for charging (for power reception) and the antenna for wireless communication increases the number of components of the devices, making downsizing of the devices difficult. In the configuration of U.S. Pat. No. 10,176,415, wireless communication and power reception cannot be performed in parallel.

Accordingly, the present disclosure provides a short-range wireless communication device that can efficiently execute wireless communication and power reception in parallel by using a common coil in the wireless communication and the power reception.

A short-range wireless communication device having a power-receiving function according to an aspect of the present disclosure includes a power-receiving coil, a power-receiving resonance circuit, a wireless communication circuit, and a load circuit. The power-receiving coil is used for both power reception in power supply utilizing short-range radio and reception in wireless data communication utilizing the short-range radio. In the power-receiving resonance circuit, the power-receiving coil and one or more resonance capacitor/capacitors constitute a resonance circuit. Each of the wireless communication circuit and the load circuit is electrically connected with the power-receiving resonance circuit, and the load circuit performs an operation by using received power.

The power-receiving resonance circuit includes a receiving circuit and a power-receiving circuit. The receiving circuit supplies a communication voltage to the wireless communication circuit from the power-receiving coil. The power-receiving circuit supplies a power-reception current to the load circuit from the power-receiving coil.

A wireless-communication output impedance from the receiving circuit to the wireless communication circuit is larger than a power-reception output impedance from the power-receiving circuit to the load circuit at a communication frequency for performing the wireless communication. The power-reception output impedance is smaller than the wireless-communication output impedance at a power-receiving frequency for performing the power reception.

In this configuration, the output impedance of the power-receiving circuit is smaller than the output impedance of the receiving circuit at the power-receiving frequency and therefore, a current obtained by power reception can be stably supplied to the load circuit at a predetermined or higher level.

On the other hand, the output impedance of the receiving circuit is larger than the output impedance of the power-receiving circuit at the communication frequency and therefore, the Q of resonance at the communication frequency between the receiving circuit and the wireless communication circuit can be set large. This increases the load modulation level depending on resonance state switching performed in the wireless communication circuit.

According to the present disclosure, wireless communication and power reception can be efficiently performed in parallel by using a common coil in the wireless communication and the power reception, and downsizing can be realized with the reduced number of components of the device.

BRIEF DESCRIPTION OF THE DRAWINGS

FIG. 3A and FIG. 3B are diagrams illustrating a concept of communication using a short-range wireless communication IC;

FIG. 4 is a conceptual diagram illustrating a changing state of a Q of resonance;

DETAILED DESCRIPTION

First Embodiment

Figure 1:
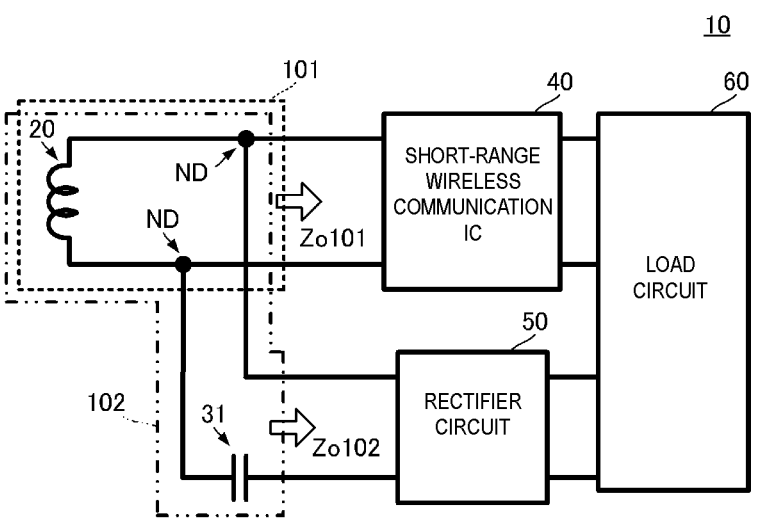
FIG. 1 is a functional block diagram illustrating a configuration of a short-range wireless communication device according to a first embodiment.

A short-range wireless communication device according to a first embodiment of the present disclosure will be described with reference to the accompanying drawings. FIG. 1 is a functional block diagram illustrating a configuration of the short-range wireless communication device according to the first embodiment.

As illustrated in FIG. 1, a short-range wireless communication device 10 includes a coil 20, a capacitor 31, a short-range wireless communication IC 40, a rectifier circuit 50, and a load circuit 60. The coil 20 corresponds to a "power-receiving coil" of the present disclosure, the capacitor 31 corresponds to a "resonance capacitor" of the present disclosure, and the short-range wireless communication IC 40 corresponds to a "wireless communication circuit" of the present disclosure. Further, a configuration portion composed of the rectifier circuit 50 and the load circuit 60 corresponds to a "load circuit" of the present disclosure.

The coil 20 is, for example, a loop coil. Both ends of the coil 20 are connected with the short-range wireless communication IC 40. The both ends of the coil 20 are also connected with the rectifier circuit 50. The coil 20 corresponds to a "power-receiving coil" of the present disclosure.

A circuit connecting the short-range wireless communication IC 40 with the coil 20 and a circuit connecting the rectifier circuit 50 with the coil 20 include nodes ND.

The capacitor 31 is connected in series between one end of the coil 20 and the rectifier circuit 50. At this time, the capacitor 31 is connected closer to the rectifier circuit 50 than the nodes ND.

The short-range wireless communication IC 40 and the rectifier circuit 50 are connected with the load circuit 60.

The short-range wireless communication IC 40 is referred to as an NFCIC, for example, and performs communication using the coil 20.

The rectifier circuit 50 rectifies a current and a voltage, which are composed of an alternating current of a predetermined frequency and received by the coil 20, so as to convert the current and voltage into a direct current, and outputs the direct current to the load circuit 60. The load circuit 60 performs a predetermined circuit operation by using an output voltage and an output current of the rectifier circuit 50. Here, an example of a specific circuit operation of the load circuit 60 will be described later.

Figure 2:
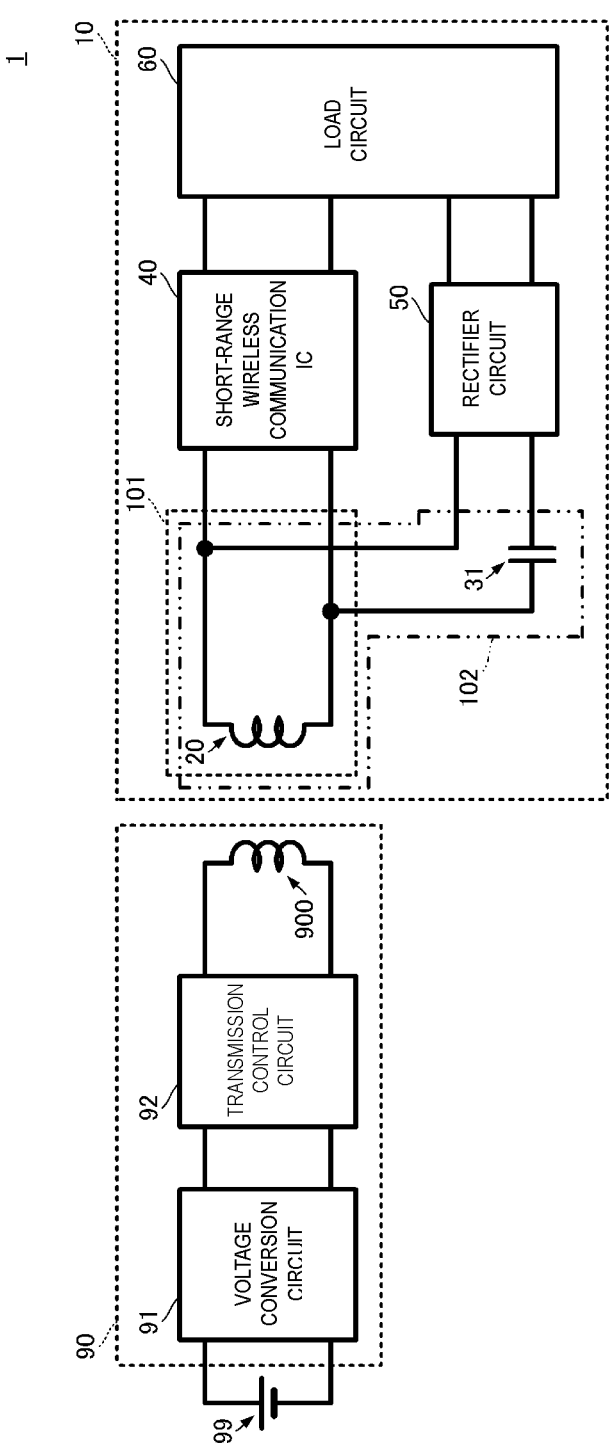
FIG. 2 is a functional block diagram illustrating a configuration of a short-range wireless communication system according to the first embodiment.

FIG. 2 is a functional block diagram illustrating a configuration of a short-range wireless communication system according to the first embodiment. As illustrated in FIG. 2, a short-range wireless communication system 1 includes a transmission device 90 and the short-range wireless communication device 10.

The transmission device 90 includes a voltage conversion circuit 91, a transmission control circuit 92, and a coil 900. The voltage conversion circuit 91 converts a voltage level of an input voltage from an external power source 99 and supplies the voltage to the transmission control circuit 92. The transmission control circuit 92 converts a DC voltage supplied from the voltage conversion circuit 91 into an AC voltage of a predetermined frequency and applies the AC voltage to the coil 900. The predetermined frequency in this case is, for example, 13.56 MHz of an ISM band. This frequency is an example and other frequencies may be employed.

The coil 900 is, for example, a loop coil. The coil 900 carries an alternating current corresponding to the applied AC voltage and generates an alternating magnetic field.

The short-range wireless communication device 10 is arranged so that the coil 20 is coupled with the alternating magnetic field generated by the coil 900. Accordingly, the coil 20 is electromagnetically induced with the alternating magnetic field generated by the coil 900 and generates an alternating current. The current generated in the coil 20 is outputted to the short-range wireless communication IC 40 and the rectifier circuit 50.

Here, the capacitor 31 constitutes a series resonance circuit with the coil 20. A resonant frequency of the series resonance circuit composed of the coil 20 and the capacitor 31 is set to the predetermined frequency mentioned above (for example, 13.56 MHz of the ISM band). Accordingly, a magnetic resonance state using the coil 20 and the coil 900 can be realized, and a power-receiving current is supplied to the rectifier circuit 50 with low loss. Efficient power reception with low loss is thus realized. A power-receiving circuit 102 is thus composed of the coil 20 and the capacitor 31.

Meanwhile, the short-range wireless communication IC 40 is capable of switching its own impedance state. Accordingly, a circuit composed of the coil 20 and the short-range wireless communication IC 40 is capable of switching a Q of resonance.

Figures 3A, 3B, 4:
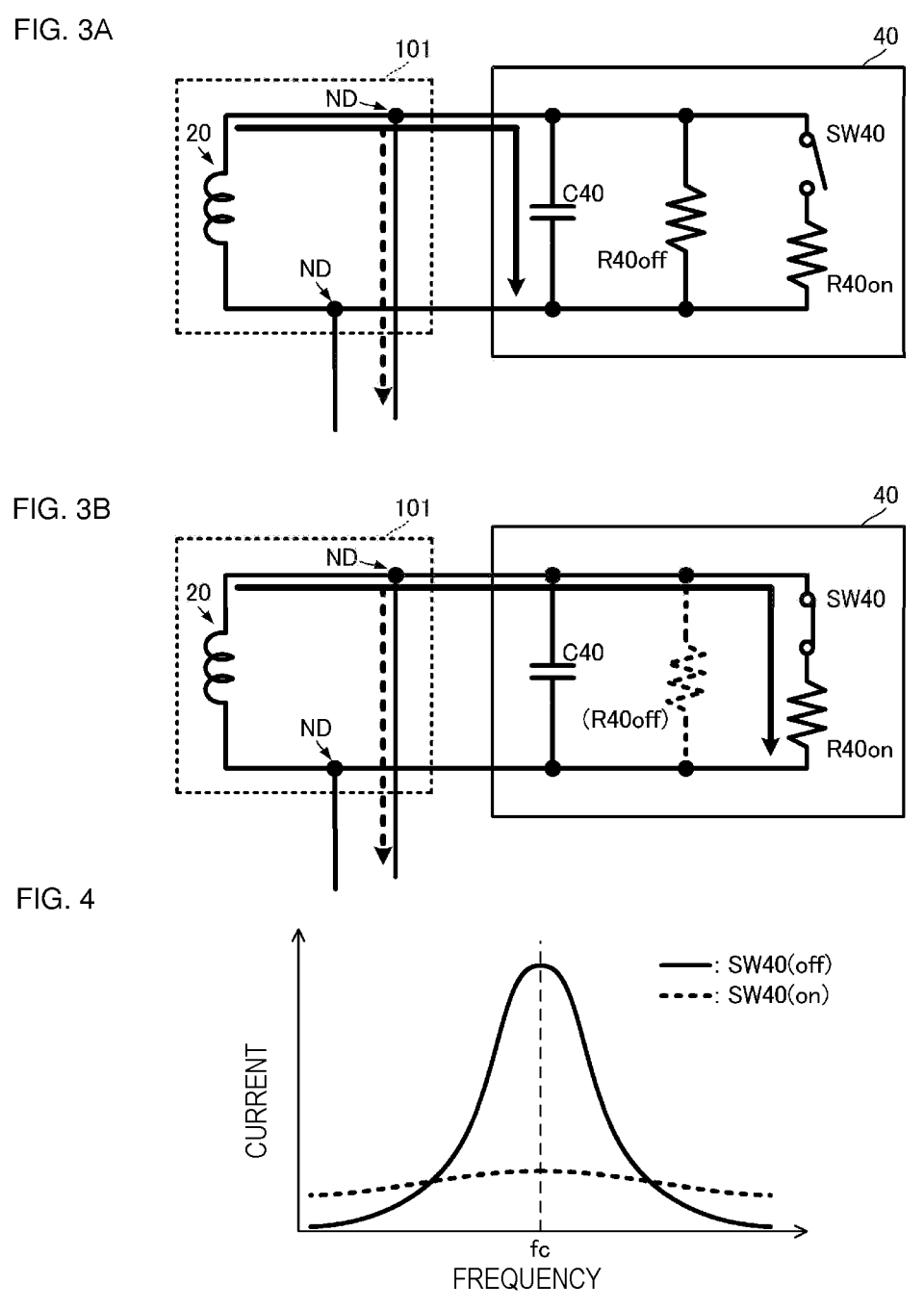

FIG. 3A and FIG. 3B are diagrams illustrating a concept of communication using the short-range wireless communication IC. FIG. 3A illustrates a state in which the Q of resonance is high, and FIG. 3B illustrates a state in which the Q of resonance is low. FIG. 4 is a conceptual diagram illustrating a changing state of a Q of resonance. In FIG. 4, the horizontal axis indicates frequency and the vertical axis indicates a value of a current flowing through the receiving circuit.

As illustrated in FIG. 3A and FIG. 3B, the short-range wireless communication IC 40 includes a parallel circuit composed of a capacitor C40 and a switch SW40. The short-range wireless communication IC 40 does not limitedly have this configuration, but the short-range wireless communication IC 40 has the configuration illustrated in FIG. 3A and FIG. 3B as a minimal configuration for adjusting the Q of resonance even when including other circuit components.

The short-range wireless communication IC 40 turns the switch SW40 into an open state (off state) as a first state, as illustrated in FIG. 3A. In this state, a parallel circuit composed of an open resistance R40off of the switch SW40 and the capacitor C40 is formed in the short-range wireless communication IC 40. The open resistance R40off is very large and therefore, a current flowing from the coil 20 to the short-range wireless communication IC 40 flows into the capacitor C40 of the short-range wireless communication IC 40. This forms a resonance circuit composed of the coil 20 and the capacitor C40. The resonance circuit is thus composed only of the coil 20 and the capacitor C40, increasing the Q of resonance (see the solid line in FIG. 4).

The short-range wireless communication IC 40 turns the switch SW40 into a conduction state (on state) as a second state, as illustrated in FIG. 3B. In this state, a parallel circuit composed of a conduction resistance R40on of the switch SW40 and the capacitor C40 is formed in the short-range wireless communication IC 40. The conduction resistance R40on is very small and therefore, a current flowing from the coil 20 to the short-range wireless communication IC 40 mainly flows into the conduction resistance R40on of the short-range wireless communication IC 40. Accordingly, the resonance circuit composed only of the coil 20 and the capacitor C40 cannot be realized, and the Q of resonance is lowered (see the dashed line in FIG. 4). The circuit composed of the coil 20 and the short-range wireless communication IC 40 is thus capable of switching the Q of resonance.

By this switching of the Q of resonance, the short-range wireless communication device 10 realizes load modulation. That is, the short-range wireless communication device 10 switches the coupling state between the coil 20 and the coil 900 by switching the Q of resonance. At this time, as illustrated with a dashed arrow in FIG. 3A and FIG. 3B, a stable current flows into the power-receiving circuit 102 irrespective of a resonance state between a receiving circuit 101 and the short-range wireless communication IC 40 (details will be described later).

The transmission control circuit 92 of the transmission device 90 includes a voltage monitoring unit (whose illustration is omitted). The voltage monitoring unit monitors an input voltage of the coil 900. When the coupling state between the coil 20 and the coil 900 is changed through switching of the Q of resonance by the short-range wireless communication device 10, as described above, the input voltage of the coil 900 is changed along with the change of the coupling state.

Figure 5A:
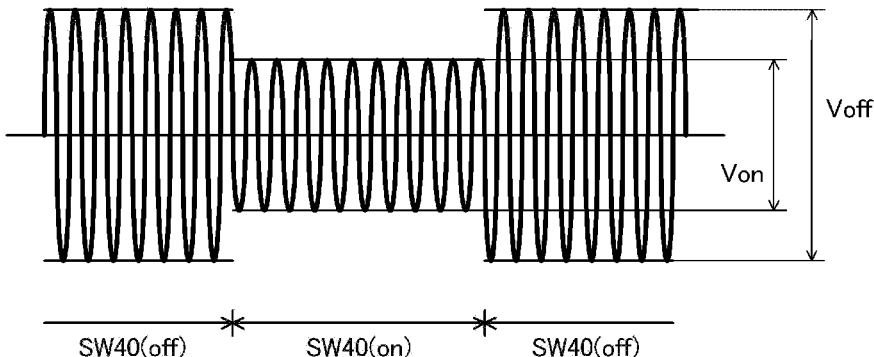
FIG. 5A and FIG. 5B are waveform diagrams illustrating an example of an input voltage.
Figure 5B:
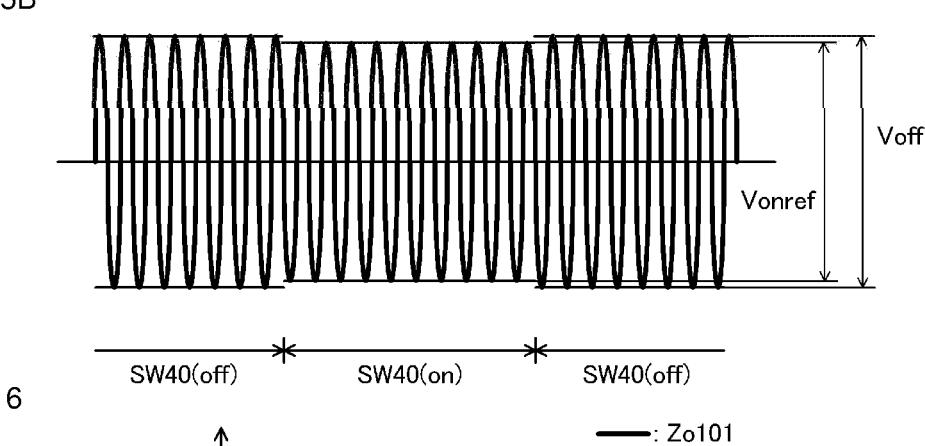

FIG. 5A and FIG. 5B are waveform diagrams illustrating an example of an input voltage. FIG. 5A illustrates the case of the disclosure of the present application, and FIG. 5B illustrates a case of a comparative example. The comparative example is, for example, an example in which parameter setting cannot be performed by the receiving circuit 101 that is unique to the disclosure of the present application and will be described later.

In the open state (off state) of the switch SW40, the Q of resonance is high and the coil 20 and the coil 900 are in the resonance state, increasing an amplitude of an input voltage Voff as illustrated in FIG. 5A. In the conduction state (on state) of the switch SW40, the Q of resonance is low and the coupling degree between the coil 20 and the coil 900 is lowered, decreasing a current flowing through the coil 900 and decreasing an amplitude of an input voltage Von. Thus, the input voltage of the coil 900 is changed in response to the change of the opening state and conduction state of the switch SW40, that is, state transition. The voltage monitoring unit detects this change of input voltage.

The short-range wireless communication device 10 associates the bit of communication data with the change of the Q of resonance during data communication with the transmission device 90. The transmission device 90 can demodulate the bit of communication data by detecting the change in the input voltage of the coil 900.

Accordingly, the short-range wireless communication device 10 and the transmission device 90 can realize transmission and reception of communication data, that is, wireless communication by utilizing the electromagnetic induction between the coil 900 and the coil 20. The coil 20 thus constitutes the receiving circuit 101. The receiving circuit 101 and the power-receiving circuit 102 described above constitute the "power-receiving resonance circuit" of the present disclosure.

In the short-range wireless communication device 10 and the short-range wireless communication system 1 described above, the short-range wireless communication device 10 further has the following features.

At the predetermined frequency described above, in other words, at a power-receiving frequency fp and a communication frequency fc, an output impedance Zo102 of the power-receiving circuit 102 is smaller than an output impedance Zo101 of the receiving circuit 101. Conversely, the output impedance Zo101 of the receiving circuit 101 is larger than the output impedance Zo102 of the power-receiving circuit 102.

More specifically, the output impedance Zo102 of the power-receiving circuit 102 is smaller than the output impedance Zo101 of the receiving circuit 101 at the power-receiving frequency fp. Further, the output impedance Zo101 of the receiving circuit 101 is larger than the output impedance Zo102 of the power-receiving circuit 102 at the communication frequency fc.

Here, the output impedance Zo101 of the receiving circuit 101 is an impedance of an output end from the receiving circuit 101 to the short-range wireless communication IC 40. Further, the output impedance Zo102 of the power-receiving circuit 102 is an impedance of an output end from the power-receiving circuit 102 to the rectifier circuit 50.

Figure 6:
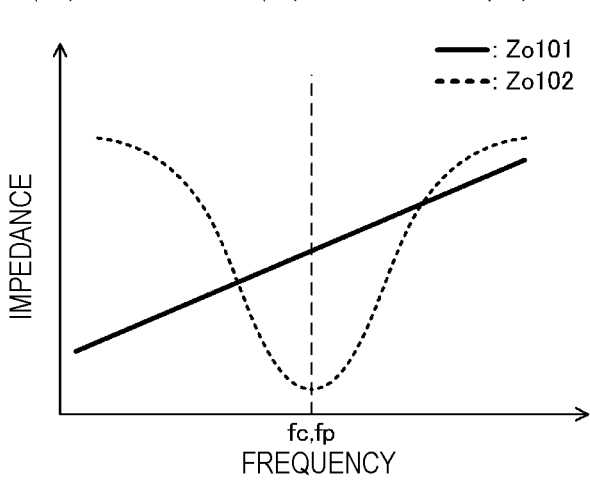
FIG. 6 is a graph illustrating an example of frequency characteristics of an output impedance.

FIG. 6 is a graph illustrating an example of frequency characteristics of an output impedance.

The receiving circuit 101 is composed of the coil 20. Accordingly, the output impedance Zo101 of the receiving circuit 101 increases as the frequency rises, as illustrated in FIG. 6.

The power-receiving circuit 102 is composed of a series resonance circuit of the coil 20 and the capacitor 31, where the resonant frequency is set so as to match to the communication frequency fc and the power-receiving frequency fp. Accordingly, the output impedance Zo102 of the power-receiving circuit 102 changes so as to be minimum at the communication frequency fc and the power-receiving frequency fp, as illustrated in FIG. 6.

Here, the output impedance Zo102 of the power-receiving circuit 102 can be set smaller than the output impedance Zo101 of the receiving circuit 101, at the communication frequency fc and the power-receiving frequency fp, by appropriately setting the capacitance of the capacitor 31, as illustrated in FIG. 6. Conversely, the output impedance Zo101 of the receiving circuit 101 can be set larger than the output impedance Zo102 of the power-receiving circuit 102.

With this configuration, the current outputted from the coil 20 mainly flows in the power-receiving circuit 102 as a power-receiving current to be supplied to the rectifier circuit

50 at the power-receiving frequency fp. At this time, the output impedance Zo102 of the power-receiving circuit 102 is small (low).

Accordingly, a loss in the power-receiving circuit 102 is suppressed and the power-receiving current is supplied to the rectifier circuit 50 with low loss. As a result, the short-range wireless communication device 10 can realize excellent power-receiving characteristics.

Further, this configuration makes it possible to appropriately set the Q of resonance between the coil 20 and the short-range wireless communication IC 40 at the communication frequency fc.

More specifically, the output impedance Zo101 of the receiving circuit 101 can be increased without being lowered as substantially small as the output impedance Zo102 of the power-receiving circuit 102. Accordingly, the resonance state at the communication frequency fc can be appropriately set.

That is, the inductance of the coil 20 can be set so that a high Q of resonance can be obtained at the communication frequency fc depending, for example, on a capacitor of the short-range wireless communication IC 40. Thus, the short-range wireless communication device 10 can appropriately set the state of high Q and the state of low Q of resonance between the receiving circuit 101 and the short-range wireless communication IC 40 at the communication frequency fc, as illustrated in FIG. 4. As a result, the short-range wireless communication device 10 can realize excellent communication characteristics. More specifically, the short-range wireless communication device 10 can realize a high load modulation level.

At this time, the short-range wireless communication device 10 preferably sets the change rate of the impedance of the receiving circuit 101 in load modulation to 30% or higher, more preferably, approximately 50% by appropriately setting the inductance of the coil 20. As a result, the short-range wireless communication device 10 can realize more excellent communication characteristics.

With the configuration described above, the short-range wireless communication device 10 can perform power reception and reception (communication) in parallel only with the coil 20. Thus, the short-range wireless communication device 10 can be downsized with fewer components thereof. Further, the short-range wireless communication device 10 can individually set power-receiving characteristics and communication characteristics, being able to exhibit excellent power-receiving characteristics and excellent communication characteristics.

(Example of Application of Load Circuit 60)

Figure 7:
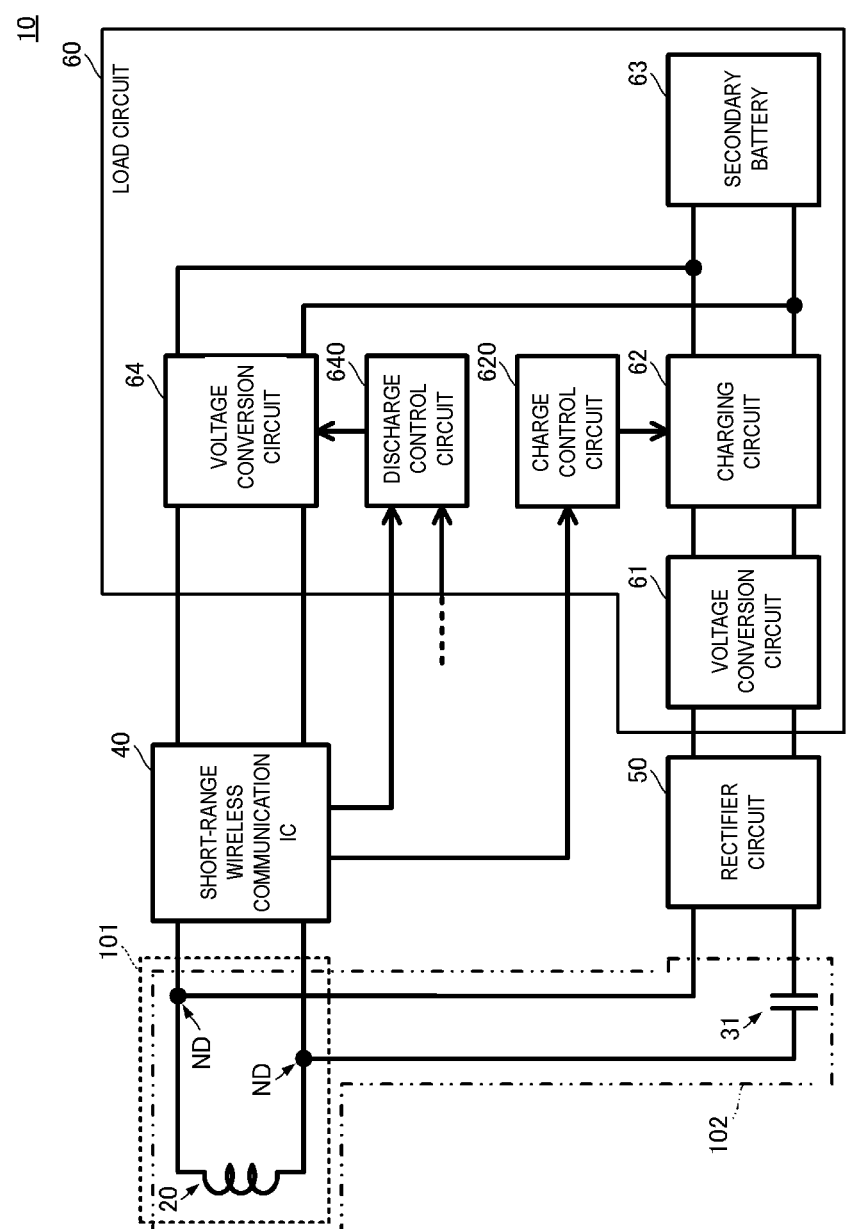
FIG. 7 is a functional block diagram illustrating a configuration example of a short-range wireless communication device including an example of a load circuit.

FIG. 7 is a functional block diagram illustrating a configuration example of a short-range wireless communication device including an example of a load circuit. In FIG. 7, the components of the short-range wireless communication device 10 other than the load circuit 60 have been described above, and new description of these components will be therefore omitted.

As illustrated in FIG. 7, the load circuit 60 includes a voltage conversion circuit 61, a charging circuit 62, a secondary battery 63, a voltage conversion circuit 64, a charge control circuit 620, and a discharge control circuit 640.

The voltage conversion circuit 61 converts a voltage level of an output voltage of the rectifier circuit 50. The voltage conversion circuit 61 outputs the converted voltage to the charging circuit 62.

The charging circuit 62 generates a charging voltage from a DC voltage received from the voltage conversion circuit

61 and charges the secondary battery 63. At this time, the charging circuit 62 outputs a charging voltage in response to a charge control signal received from the charge control circuit 620. The charge control circuit 620 refers to, for example, a charge instruction from the short-range wireless communication IC 40 and generates a charge control signal. Here, the charging circuit 62 can also output the charging voltage to the voltage conversion circuit 64.

The voltage conversion circuit 64 converts a voltage level of an output voltage received from the charging circuit 62 or the secondary battery 63 into a voltage level for the short-range wireless communication IC 40. The voltage conversion circuit 64 supplies the converted voltage to the short-range wireless communication IC 40. At this time, the voltage conversion circuit 64 supplies the converted voltage to the short-range wireless communication IC 40 in response to a discharge control signal (power-supply control signal) received from the discharge control circuit 640. The discharge control circuit 640 refers to, for example, a charge instruction from the short-range wireless communication IC 40 and a monitoring state of a voltage level on a predetermined point of the load circuit 60 so as to generate a discharge control signal (power-supply control signal).

(Example of Configuration of Short-Range Wireless Communication Device 10)

Figure 8:
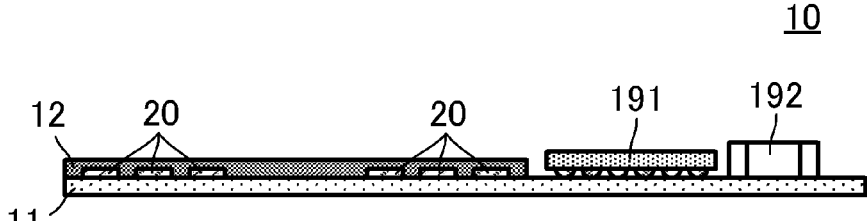
FIG. 8 is a side sectional view illustrating an example of a structure of a short-range wireless communication device according to the present disclosure.

FIG. 8 is a side sectional view illustrating an example of a structure of a short-range wireless communication device according to the present disclosure. As illustrated in FIG. 8, the short-range wireless communication device 10 includes a supporting base material 11, a magnetic sheet 12, the coil 20, an electronic component 191, and an electronic component 192. Here, FIG. 8 illustrates a single piece of electronic component 191 and a single piece of electronic component 192. However, the electronic component 191 and the electronic component 192 are provided in numbers so as to be able to constitute a circuit of the short-range wireless communication device 10.

The supporting base material 11 is a flat plate or a flat film, and a conductor pattern for realizing a circuit of the short-range wireless communication device 10 is formed on the supporting base material 11 mainly with an insulating material.

The coil 20 is composed of a wound-shaped linear conductor pattern formed by being wound in a predetermined number of times. The coil 20 is formed on one main surface of the supporting base material 11. The magnetic sheet 12 is arranged on one main surface of the supporting base material 11 so as to include a forming region of the coil 20.

The electronic component 191 is an electronic component having a solder bump formed on a mounting surface thereof. The electronic component 192 is an electronic component having terminal electrodes on both respective ends of a housing. The electronic component 191 is, for example, the short-range wireless communication IC 40, an IC of the rectifier circuit 50, or an IC of the load circuit 60. The electronic component 192 is, for example, the capacitor 31, various passive elements of the rectifier circuit 50, or various passive elements of the load circuit 60.

The electronic component 191 and the electronic component 192 are mounted on one main surface of the supporting base material 11. However, at least part of the electronic component 191 and the electronic component 192 may be mounted on the other main surface of the supporting base material 11.

This configuration allows the short-range wireless communication device 10 to be formed thin. Further, the provision of the magnetic sheet 12 realizes increase in the magnetic flux density of the coil 20. This realizes increase in power-receiving energy and communication energy in the short-range wireless communication device 10.

Here, the load circuit 60 does not have to include the secondary battery 63. However, provision of the secondary battery 63 allows the short-range wireless communication device 10 to store energy and realize stable operations of the short-range wireless communication IC 40, the load circuit 60, and the like.

Second Embodiment

Figure 9:
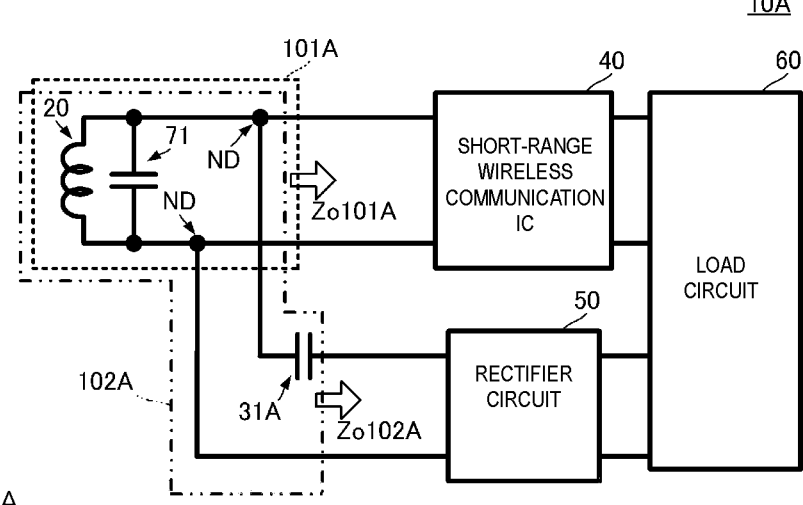
FIG. 9 is a functional block diagram illustrating a configuration of a short-range wireless communication device according to a second embodiment.
Figure 10A:
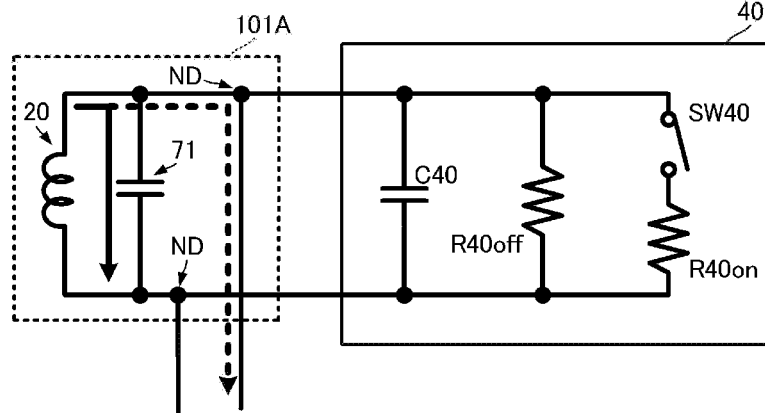
FIG. 10A and FIG. 10B are diagrams illustrating a concept of communication using the short-range wireless communication IC.
Figure 10B:
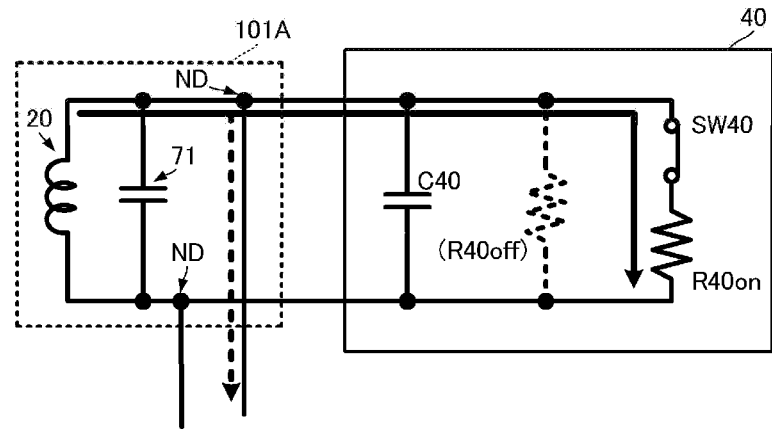

A short-range wireless communication device according to a second embodiment of the present disclosure will be described with reference to the accompanying drawings. FIG. 9 is a functional block diagram illustrating a configuration of the short-range wireless communication device according to the second embodiment. FIG. 10A and FIG. 10B are diagrams illustrating a concept of communication using the short-range wireless communication IC. FIG. 10A illustrates a state in which the Q of resonance is high, and FIG. 10B illustrates a state in which the Q of resonance is low.

As illustrated in FIG. 9, a short-range wireless communication device 10A according to the second embodiment is different from the short-range wireless communication device 10 according to the first embodiment in that the short-range wireless communication device 10A includes a receiving circuit 101A and a power-receiving circuit 102A. Other configurations of the short-range wireless communication device 10A are the same as those of the short-range wireless communication device 10 and the description of the same portions will be omitted.

The receiving circuit 101A includes the coil 20 and a capacitor 71. The coil 20 and the capacitor 71 are connected in parallel.

The power-receiving circuit 102A includes the coil 20, the capacitor 71, and a capacitor 31A. The parallel circuit composed of the coil 20 and the capacitor 71 is shared with the receiving circuit 101A. The capacitor 31A is connected in series between the node ND and the rectifier circuit 50.

In this configuration, an output impedance Zo101A of the receiving circuit 101A is set by the parallel circuit composed of the coil 20 and the capacitor 71. An output impedance Zo102A of the power-receiving circuit 102A is set by the parallel circuit, composed of the coil 20 and the capacitor 71, and the capacitor 31A.

Further, the output impedance Zo101A of the receiving circuit 101A can be set larger than the output impedance Zo102A of the power-receiving circuit 102A at the communication frequency fc, and the output impedance Zo102A of the power-receiving circuit 102A can be set smaller than the output impedance Zo101A of the receiving circuit 101A at the power-receiving frequency fp, by appropriately setting the capacitance of the capacitor 71 and the capacitance of the capacitor 31A.

The output impedance Zo101A of the receiving circuit 101A is larger than the output impedance Zo102A of the power-receiving circuit 102A at the communication frequency fc and therefore, the short-range wireless communication device 10A can realize a desired load modulation level by switching a current path for communication as illustrated in FIG. 10A and FIG. 10B for increase in the difference of the Q of resonance, as is the case with the short-range wireless communication device 10 of the first embodiment.

The output impedance Zo102A of the power-receiving circuit 102A is smaller than the output impedance Zo101A of the receiving circuit 101A at the power-receiving frequency fp and therefore, a sufficient level of current for power supply can be supplied from the power-receiving circuit 102A to the rectifier circuit 50 and the load circuit 60 with low loss.

As a result, the short-range wireless communication device 10A can perform power reception and communication in parallel and individually set power-receiving characteristics and communication characteristics, being able to exhibit excellent power-receiving characteristics and excellent communication characteristics.

Further, the short-range wireless communication device 10A includes the capacitor 71 and therefore, the short-range wireless communication device 10A can realize impedance matching between the coil 20 and the short-range wireless communication IC 40 without changing the inductance of the coil 20, the capacitance of the short-range wireless communication IC 40, and the like. As a result, the short-range wireless communication device 10A can realize a high Q of resonance to be used in communication while suppressing transmission loss.

Third Embodiment

Figure 11:
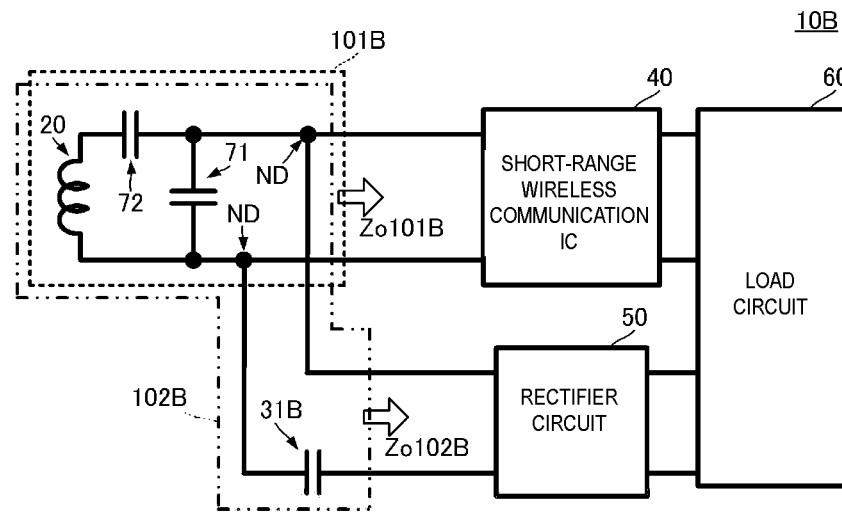
FIG. 11 is a functional block diagram illustrating a configuration of a short-range wireless communication device according to a third embodiment.
Figure 12A:
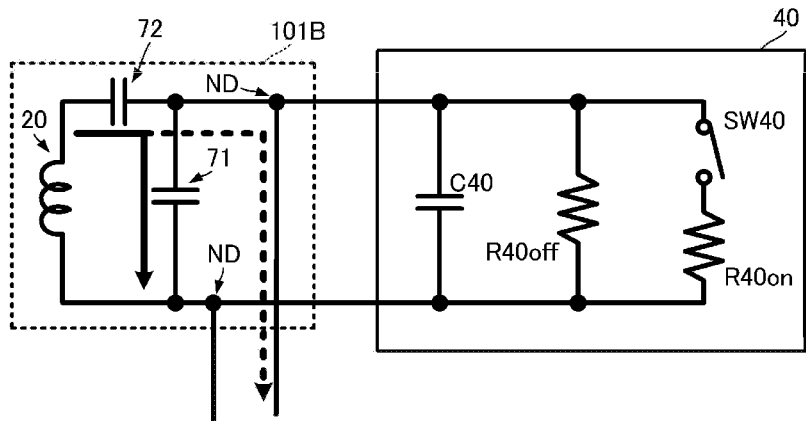
FIG. 12A and FIG. 12B are diagrams illustrating a concept of communication using the short-range wireless communication IC.
Figure 12B:
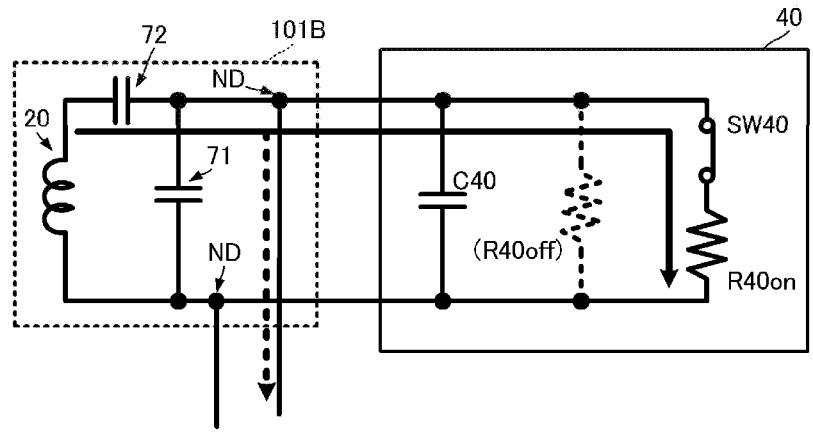

A short-range wireless communication device according to a third embodiment of the present disclosure will be described with reference to the accompanying drawings. FIG. 11 is a functional block diagram illustrating a configuration of the short-range wireless communication device according to the third embodiment. FIG. 12A and FIG. 12B are diagrams illustrating a concept of communication using the short-range wireless communication IC. FIG. 12A illustrates a state in which the Q of resonance is high, and FIG. 12B illustrates a state in which the Q of resonance is low.

As illustrated in FIG. 11, a short-range wireless communication device 10B according to the third embodiment is different from the short-range wireless communication device 10A according to the second embodiment in that the short-range wireless communication device 10B includes a receiving circuit 101B and a power-receiving circuit 102B. Other configurations of the short-range wireless communication device 10B are the same as those of the short-range wireless communication device 10A and the description of the same portions will be omitted.

The receiving circuit 101B includes the coil 20, the capacitor 71, and a capacitor 72. The capacitor 72 is connected to one end of the coil 20 and one end of the capacitor 71, and a connecting point between the capacitor 72 and the capacitor 71 (a node between the capacitors) is connected to one node ND. A connecting point between the other end of the coil 20 and the other end of the capacitor 71 (a node between the coil 20 and the capacitor 71) is connected to the other node ND.

The power-receiving circuit 102B includes the coil 20, the capacitor 71, the capacitor 72, and a capacitor 31B. A circuit composed of the coil 20, the capacitor 71, and the capacitor 72 is shared with the receiving circuit 101B. The capacitor 31B is connected in series between the node ND and the rectifier circuit 50.

In this configuration, an output impedance Zo101B of the receiving circuit 101B is set by the circuit composed of the coil 20, the capacitor 71, and the capacitor 72. An output impedance Zo102B of the power-receiving circuit 102B is set by the circuit, which is composed of the coil 20, the capacitor 71, and the capacitor 72, and the capacitor 31B.

Further, the output impedance Zo101B of the receiving circuit 101B can be set larger than the output impedance Zo102B of the power-receiving circuit 102B at the communication frequency fc, and the output impedance Zo102B of the power-receiving circuit 102B can be set smaller than the output impedance Zo101B of the receiving circuit 101B at the power-receiving frequency fp, by appropriately setting the capacitance of the capacitor 71, the capacitance of the capacitor 72, and the capacitance of the capacitor 31B.

The output impedance Zo101B of the receiving circuit 101B is larger than the output impedance Zo102B of the power-receiving circuit 102B at the communication frequency fc and therefore, the short-range wireless communication device 10B can realize a desired load modulation level by switching a current path for communication as illustrated in FIG. 12A and FIG. 12B for increase in the difference of the Q of resonance, as is the case with the short-range wireless communication devices 10 and 10A of the first and second embodiments.

The output impedance Zo102B of the power-receiving circuit 102B is smaller than the output impedance Zo101B of the receiving circuit 101B at the power-receiving frequency fp and therefore, a sufficient level of current for power supply can be supplied from the power-receiving circuit 102B to the rectifier circuit 50 and the load circuit 60 with low loss.

As a result, the short-range wireless communication device 10B can perform power reception and communication in parallel and individually set power-receiving characteristics and communication characteristics, being able to exhibit excellent power-receiving characteristics and excellent communication characteristics.

Further, the short-range wireless communication device 10B includes the capacitor 71 and the capacitor 72 and therefore, the short-range wireless communication device 10B can realize impedance matching between the coil 20 and the short-range wireless communication IC 40 without changing the inductance of the coil 20, the capacitance of the short-range wireless communication IC 40, and the like. As a result, the short-range wireless communication device 10B can realize a high Q of resonance to be used in communication while suppressing transmission loss.

Fourth Embodiment

Figure 13:
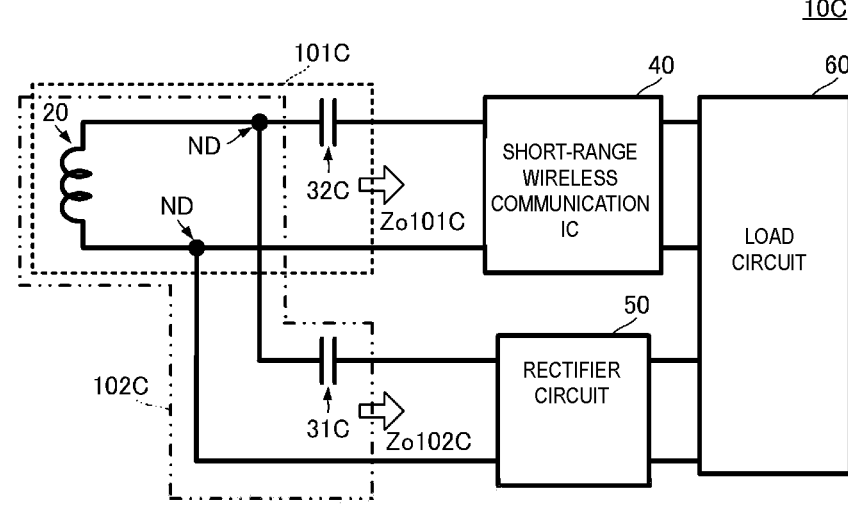
FIG. 13 is a functional block diagram illustrating a configuration of a short-range wireless communication device according to a fourth embodiment.
Figure 14A:
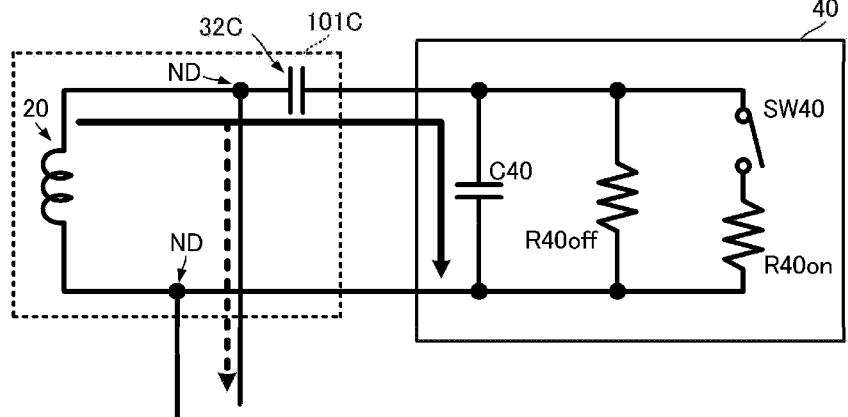
FIG. 14A and FIG. 14B are diagrams illustrating a concept of communication using the short-range wireless communication IC.
Figure 14B:
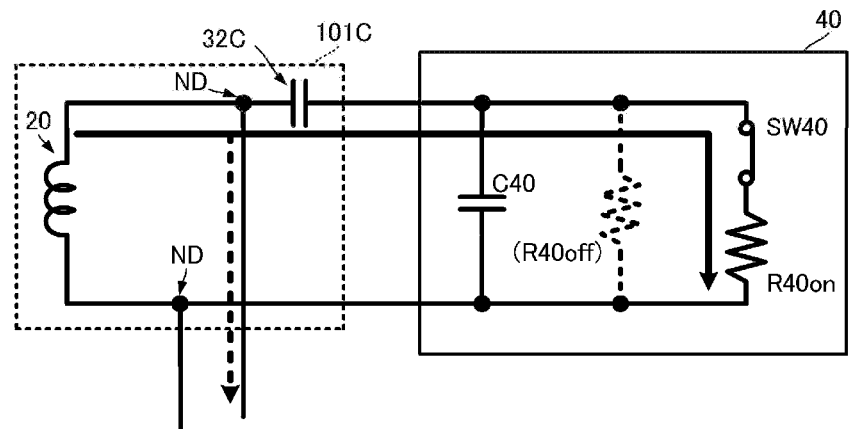

A short-range wireless communication device according to a fourth embodiment of the present disclosure will be described with reference to the accompanying drawings. FIG. 13 is a functional block diagram illustrating a configuration of the short-range wireless communication device according to the fourth embodiment. FIG. 14A and FIG. 14B are diagrams illustrating a concept of communication using the short-range wireless communication IC. FIG. 14A illustrates a state in which the Q of resonance is high, and FIG. 14B illustrates a state in which the Q of resonance is low.

As illustrated in FIG. 13, a short-range wireless communication device 10C according to the fourth embodiment is different from the short-range wireless communication device 10 according to the first embodiment in that the short-range wireless communication device 10C includes a receiving circuit 101C and a power-receiving circuit 102C. Other configurations of the short-range wireless communication device 10C are the same as those of the short-range wireless communication device 10 and the description of the same portions will be omitted.

The receiving circuit 101C includes the coil 20 and a capacitor 32C. The coil 20 and the capacitor 32C are connected in series. The capacitor 32C is connected in series between the node ND and the short-range wireless communication IC 40. The capacitor 32C corresponds to a "second resonance capacitor" of the present disclosure.

The power-receiving circuit 102C includes the coil 20 and a capacitor 31C. The coil 20 is shared with the receiving circuit 101C. The capacitor 31C is connected in series between the node ND and the rectifier circuit 50. The capacitor 31C corresponds to a "first resonance capacitor" of the present disclosure.

In this configuration, an output impedance Zo101C of the receiving circuit 101C is set by the series circuit composed of the coil 20 and the capacitor 32C. An output impedance Zo102C of the power-receiving circuit 102C is set by the series circuit composed of the coil 20 and the capacitor 31C.

Further, the output impedance Zo101C of the receiving circuit 101C can be set larger than the output impedance Zo102C of the power-receiving circuit 102C at the communication frequency fc, and the output impedance Zo102C of the power-receiving circuit 102C can be set smaller than the output impedance Zo101C of the receiving circuit 101C at the power-receiving frequency fp, by setting the capacitance of the capacitor 31C larger than the capacitance of the capacitor 32C.

The output impedance Zo101C of the receiving circuit 101C is larger than the output impedance Zo102C of the power-receiving circuit 102C at the communication frequency fc and therefore, the short-range wireless communication device 10C can realize a desired load modulation level by switching a current path for communication as illustrated in FIG. 14A and FIG. 14B for increase in the difference of the Q of resonance, as is the case with the short-range wireless communication device 10 of the first embodiment.

The output impedance Zo102C of the power-receiving circuit 102C is smaller than the output impedance Zo101C of the receiving circuit 101C at the power-receiving frequency fp and therefore, a sufficient level of current for power supply can be supplied from the power-receiving circuit 102C to the rectifier circuit 50 and the load circuit 60 with low loss.

As a result, the short-range wireless communication device 10C can perform power reception and communication in parallel and individually set power-receiving characteristics and communication characteristics, being able to exhibit excellent power-receiving characteristics and excellent communication characteristics.

Fifth Embodiment

Figure 15:
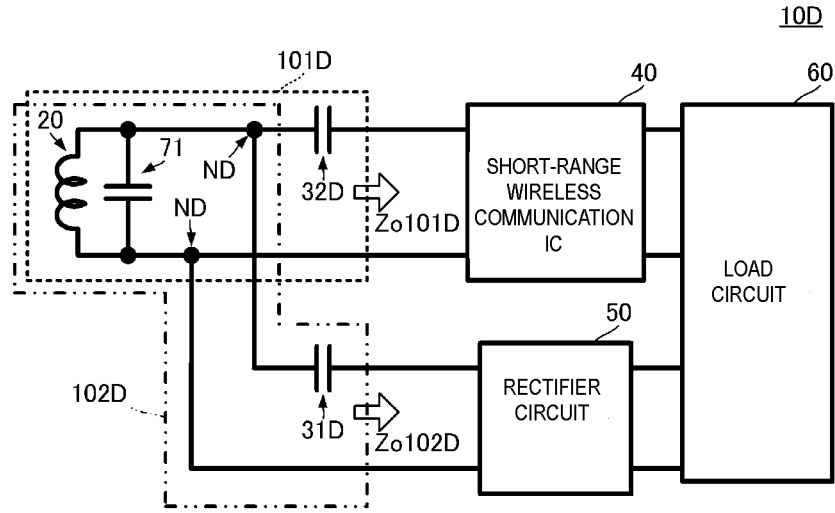
FIG. 15 is a functional block diagram illustrating a configuration of a short-range wireless communication device according to a fifth embodiment.

A short-range wireless communication device according to a fifth embodiment of the present disclosure will be described with reference to the accompanying drawings. FIG. 15 is a functional block diagram illustrating a configuration of the short-range wireless communication device according to the fifth embodiment.

As illustrated in FIG. 15, a short-range wireless communication device 10D according to the fifth embodiment has the configuration obtained by appropriately combining the short-range wireless communication device 10A according to the second embodiment with the short-range wireless communication device 10C according to the fourth embodiment. Description will be provided below for only points different from the short-range wireless communication device 10A according to the second embodiment.

As illustrated in FIG. 15, the short-range wireless communication device 10D according to the fifth embodiment is different from the short-range wireless communication device 10A according to the second embodiment in that the short-range wireless communication device 10D includes a receiving circuit 101D and a power-receiving circuit 102D. Other configurations of the short-range wireless communication device 10D are the same as those of the short-range wireless communication device 10A and the description of the same portions will be omitted.

The receiving circuit 101D includes the coil 20, the capacitor 71, and a capacitor 32D. The capacitor 32D is connected in series between the node ND and the short-range wireless communication IC 40. The capacitor 32D corresponds to the "second resonance capacitor" of the present disclosure.

The power-receiving circuit 102D includes the coil 20, the capacitor 71, and a capacitor 31D. The coil 20 and the capacitor 71 are shared with the receiving circuit 101D. The capacitor 31D is connected in series between the node ND and the rectifier circuit 50. The capacitor 31D corresponds to the "first resonance capacitor" of the present disclosure.

In this configuration, an output impedance Zo101D of the receiving circuit 101D is set by the circuit composed of the coil 20, the capacitor 71, and the capacitor 32D. An output impedance Zo102D of the power-receiving circuit 102D is set by the circuit composed of the coil 20, the capacitor 71, and the capacitor 31D.

Further, the output impedance Zo101D of the receiving circuit 101D can be set larger than the output impedance Zo102D of the power-receiving circuit 102D at the communication frequency fc, and the output impedance Zo102D of the power-receiving circuit 102D can be set smaller than the output impedance Zo101D of the receiving circuit 101D at the power-receiving frequency fp, by setting the capacitance of the capacitor 31D larger than the capacitance of the capacitor 32D.

The output impedance Zo101D of the receiving circuit 101D is larger than the output impedance Zo102D of the power-receiving circuit 102D at the communication frequency fc and therefore, the short-range wireless communication device 10D can realize a desired load modulation level by switching a current path for communication as in the above-described embodiments for increase in the difference of the Q of resonance, as is the case with the short-range wireless communication device 10A of the second embodiment.

The output impedance Zo102D of the power-receiving circuit 102D is smaller than the output impedance Zo101D of the receiving circuit 101D at the power-receiving frequency fp and therefore, a sufficient level of current for power supply can be supplied from the power-receiving circuit 102D to the rectifier circuit 50 and the load circuit 60 with low loss.

As a result, the short-range wireless communication device 10D can perform power reception and communication in parallel and individually set power-receiving characteristics and communication characteristics, being able to exhibit excellent power-receiving characteristics and excellent communication characteristics.

Sixth Embodiment

Figure 16:
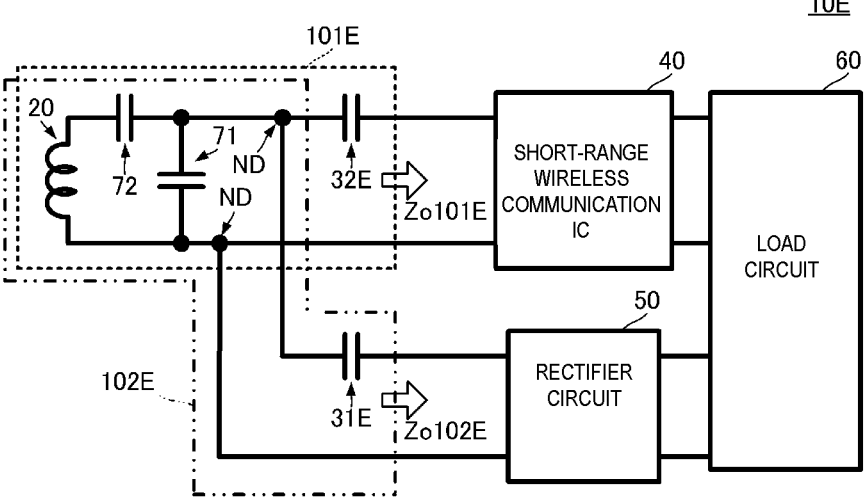
FIG. 16 is a functional block diagram illustrating a configuration of a short-range wireless communication device according to a sixth embodiment.

A short-range wireless communication device according to a sixth embodiment of the present disclosure will be described with reference to the accompanying drawings. FIG. 16 is a functional block diagram illustrating a configuration of the short-range wireless communication device according to the sixth embodiment.

As illustrated in FIG. 16, a short-range wireless communication device 10E according to the sixth embodiment has the configuration obtained by appropriately combining the short-range wireless communication device 10B according to the third embodiment with the short-range wireless communication device 10C according to the fourth embodiment. Description will be provided below for only points different from the short-range wireless communication device 10B according to the third embodiment.

As illustrated in FIG. 16, the short-range wireless communication device 10E according to the sixth embodiment is different from the short-range wireless communication device 10B according to the third embodiment in that the short-range wireless communication device 10E includes a receiving circuit 101E and a power-receiving circuit 102E. Other configurations of the short-range wireless communication device 10E are the same as those of the short-range wireless communication device 10B and the description of the same portions will be omitted.

The receiving circuit 101E includes the coil 20, the capacitor 71, the capacitor 72, and a capacitor 32E. The capacitor 32E is connected in series between the node ND and the short-range wireless communication IC 40. The capacitor 32E corresponds to the "second resonance capacitor" of the present disclosure.

The power-receiving circuit 102E includes the coil 20, the capacitor 71, the capacitor 72, and a capacitor 31E. The coil 20, the capacitor 71, and the capacitor 72 are shared with the receiving circuit 101E. The capacitor 31E is connected in series between the node ND and the rectifier circuit 50. The capacitor 31E corresponds to the "first resonance capacitor" of the present disclosure.

In this configuration, an output impedance Zo101E of the receiving circuit 101E is set by the circuit composed of the coil 20, the capacitor 71, the capacitor 72, and the capacitor 32E. An output impedance Zo102E of the power-receiving circuit 102E is set by the circuit composed of the coil 20, the capacitor 71, the capacitor 72, and the capacitor 31E.

Further, the output impedance Zo101E of the receiving circuit 101E can be set larger than the output impedance Zo102E of the power-receiving circuit 102E at the communication frequency fc, and the output impedance Zo102E of the power-receiving circuit 102E can be set smaller than the output impedance Zo101E of the receiving circuit 101E at the power-receiving frequency fp, by setting the capacitance of the capacitor 31E larger than the capacitance of the capacitor 32E.

The output impedance Zo101E of the receiving circuit 101E is larger than the output impedance Zo102E of the power-receiving circuit 102E at the communication frequency fc and therefore, the short-range wireless communication device 10E can realize a desired load modulation level by switching a current path for communication as in the above-described embodiments for increase in the difference of the Q of resonance, as is the case with the short-range wireless communication device 10B of the third embodiment.

The output impedance Zo102E of the power-receiving circuit 102E is smaller than the output impedance Zo101E of the receiving circuit 101E at the power-receiving frequency fp and therefore, a sufficient level of current for power supply can be supplied from the power-receiving circuit 102E to the rectifier circuit 50 and the load circuit 60 with low loss.

As a result, the short-range wireless communication device 10E can perform power reception and communication in parallel and individually set power-receiving characteristics and communication characteristics, being able to exhibit excellent power-receiving characteristics and excellent communication characteristics.

In the configuration of each embodiment described above, the communication frequency fc and the power-receiving frequency fp are the same as each other. However, the above-mentioned advantageous effects can be obtained if the above-mentioned magnitude relationship between the output impedance of the receiving circuit and the output impedance of the power-receiving circuit can be secured even when the communication frequency fc and the power-receiving frequency fp are different from each other. In this case, by employing the configurations of the short-range wireless communication devices 10C, 10D, and 10E according to the fourth, fifth, and sixth embodiments described above, the output impedance of the receiving circuit and the output impedance of the power-receiving circuit can be individually adjusted, thus being effective.

Further, when the communication frequency fc and the power-receiving frequency fp are different from each other, it is preferable that at least part of the communication frequency band including the communication frequency fc and part of the power-receiving frequency band including the power-receiving frequency fp overlap with each other. Accordingly, the above-mentioned magnitude relationship between the output impedance of the receiving circuit and the output impedance of the power-receiving circuit can be secured by providing a capacitor at least to the power-receiving circuit.

What is claimed is:

1. A short-range wireless communication device having a power-receiving function, the short-range wireless communication device comprising:

a power-receiving coil that is configured for both power reception in power supply utilizing short-range radio and reception in wireless data communication utilizing the short-range radio;

a power-receiving resonance circuit in which the power-receiving coil and at least one resonance capacitor configures a resonance circuit; and a wireless communication circuit and a load circuit each of which is electrically connected with the power-receiving resonance circuit, the load circuit being configured to perform an operation using electric power, wherein the power-receiving resonance circuit includes a receiving circuit configured to supply a communication voltage to the wireless communication circuit from the power-receiving coil, and a power-receiving circuit configured to supply a power-reception current to the load circuit from the power-receiving coil, wherein the load circuit is connected to the receiving circuit through the wireless communication circuit and the load circuit is connected to the power-receiving circuit through a rectifier circuit, a wireless-communication output impedance from the receiving circuit to the wireless communication circuit is larger than a power-reception output impedance from the power-receiving circuit to the load circuit at a communication frequency for performing the wireless communication, and the power-reception output impedance is smaller than the wireless-communication output impedance at a power-receiving frequency for performing the power reception.

2. The short-range wireless communication device according to claim 1, wherein at least part of a frequency band of the communication frequency and part of a frequency band of the power-receiving frequency overlap with each other.

3. The short-range wireless communication device according to claim 2, wherein the frequency band of the communication frequency and the frequency band of the power-receiving frequency are the same as each other.

4. The short-range wireless communication device according to claim 1, wherein the at least one resonance capacitor is only in the power-receiving circuit.

5. The short-range wireless communication device according to claim 1, wherein the at least one resonance capacitor includes a first resonance capacitor in the power-receiving circuit, and a second resonance capacitor in the receiving circuit, and resonance capacitance of the first resonance capacitor is larger than resonance capacitance of the second resonance capacitor.

6. The short-range wireless communication device according to claim 1, further comprising:

a supporting base material configured to support the power-receiving coil and the power-receiving resonance circuit, wherein the power-receiving coil and the power-receiving resonance circuit are on the same plane.

7. The short-range wireless communication device according to claim 6, further comprising:

a magnetic sheet that overlaps with the power-receiving coil.

8. The short-range wireless communication device according to claim 1, wherein the load circuit includes a secondary battery.

9. The short-range wireless communication device according to claim 1, wherein a change rate of an impedance of the receiving circuit in load modulation in the wireless communication is set to 30% or higher.

10. The short-range wireless communication device according to claim 2, wherein the at least one resonance capacitor is only in the power-receiving circuit.

11. The short-range wireless communication device according to claim 3, wherein the at least one resonance capacitor is only in the power-receiving circuit.

12. The short-range wireless communication device according to claim 2, wherein the at least one resonance capacitor includes a first resonance capacitor in the power-receiving circuit, and a second resonance capacitor in the receiving circuit, and resonance capacitance of the first resonance capacitor is larger than resonance capacitance of the second resonance capacitor.

13. The short-range wireless communication device according to claim 3, wherein the at least one resonance capacitor includes a first resonance capacitor in the power-receiving circuit, and a second resonance capacitor in the receiving circuit, and resonance capacitance of the first resonance capacitor is larger than resonance capacitance of the second resonance capacitor.

14. The short-range wireless communication device according to claim 2, further comprising:

a supporting base material configured to support the power-receiving coil and the power-receiving resonance circuit, wherein the power-receiving coil and the power-receiving resonance circuit are on the same plane.

15. The short-range wireless communication device according to claim 3, further comprising:

a supporting base material configured to support the power-receiving coil and the power-receiving resonance circuit, wherein the power-receiving coil and the power-receiving resonance circuit are on the same plane.

16. The short-range wireless communication device according to claim 4, further comprising:

a supporting base material configured to support the power-receiving coil and the power-receiving resonance circuit, wherein the power-receiving coil and the power-receiving resonance circuit are on the same plane.

17. The short-range wireless communication device according to claim 2, wherein the load circuit includes a secondary battery.

18. The short-range wireless communication device according to claim 3, wherein the load circuit includes a secondary battery.

19. The short-range wireless communication device according to claim 2, wherein a change rate of an impedance of the receiving circuit in load modulation in the wireless communication is set to 30% or higher.

20. The short-range wireless communication device according to claim 3, wherein a change rate of an impedance of the receiving circuit in load modulation in the wireless communication is set to 30% or higher.

* * * * *